(12) United States Patent
Ramlaoui et al.

(10) Patent No.: US 11,066,179 B2
(45) Date of Patent: Jul. 20, 2021

(54) FIRE SEAL ASSEMBLY FOR NACELLE DOORS

(71) Applicant: ROHR, INC., Chula Vista, CA (US)

(72) Inventors: Jihad Ramlaoui, Chula Vista, CA (US); Timothy Slattery, Florissant, MO (US)

(73) Assignee: Rohr, Inc, Chula Vista, CA (US)

( * ) Notice: Subject to any disclaimer, the term of this patent is extended or adjusted under 35 U.S.C. 154(b) by 60 days.

(21) Appl. No.: 16/564,291

(22) Filed: Sep. 9, 2019

(65) Prior Publication Data
US 2021/0070460 A1    Mar. 11, 2021

(51) Int. Cl.
 B64D 29/00 (2006.01)
 F01D 25/24 (2006.01)

(52) U.S. Cl.
 CPC ............ B64D 29/00 (2013.01); F01D 25/24 (2013.01); *F05D 2220/323* (2013.01); *F05D 2240/55* (2013.01)

(58) Field of Classification Search
 CPC ... B64D 29/00; F01D 25/24; F05D 2220/323; F05D 2240/55
 See application file for complete search history.

(56) References Cited

U.S. PATENT DOCUMENTS

| 5,927,647 | A | * | 7/1999 | Masters | .................... F02K 1/72 239/265.19 |
|---|---|---|---|---|---|
| 7,028,740 | B2 | | 4/2006 | Clarady et al. | |
| 9,567,061 | B2 | | 2/2017 | Vogt et al. | |
| 9,718,533 | B2 | | 8/2017 | Martin et al. | |
| 9,777,838 | B2 | | 10/2017 | Yahata et al. | |
| 2012/0067024 | A1 | * | 3/2012 | Vauchel | .................... F02K 1/72 60/226.2 |
| 2016/0176497 | A1 | | 6/2016 | Coppola et al. | |
| 2016/0222917 | A1 | | 8/2016 | Segat et al. | |

FOREIGN PATENT DOCUMENTS

| EP | 2910822 | 8/2015 |
|---|---|---|
| FR | 2934326 | 1/2010 |
| WO | 2009029401 | 3/2009 |

OTHER PUBLICATIONS

European Patent Office, European Search Report dated Aug. 3, 2020 in Application No. 19216691.6.

* cited by examiner

*Primary Examiner* — Shafiq Mian
(74) *Attorney, Agent, or Firm* — Snell & Wilmer L.L.P.

(57) ABSTRACT

A seal assembly may comprise a door configured to translate relative to a static structure. A seal may be disposed in a seal envelope defined, at least, partially by the static structure and the door. The seal may be configured to compress in a direction generally perpendicular to a direction of motion of the door.

16 Claims, 6 Drawing Sheets

FIRE SEAL ASSEMBLY FOR NACELLE DOORS

FIELD

The present disclosure relates to seal assemblies, and more particularly to a fire seal assembly for a door of an aircraft nacelle.

BACKGROUND

A nacelle for a propulsion system typically includes an inlet, a fan cowl, a thrust reverser, and an exhaust section. The nacelle is typically mounted to a wing or a fuselage of an aircraft via a pylon. The nacelle may provide smooth, aerodynamic surfaces for airflow around and into a gas turbine engine located within the nacelle.

Access doors may be incorporated at different locations to allow for easy and/or quick maintenance access. Pressure relief doors may also be incorporated to help reduce the internal pressures in the event of a failed pressurized ducting, which may be located throughout the nacelle. Some doors may serve as both an access door and a pressure relief door (i.e., dual purpose door). Doors located at a fire boundary may be required to meet the strict fire wall criteria, such as, for example, no flame penetration during a prescribed fire boundary condition, which typically include 2000° F. (1,093° C.) for 15 minutes with representative loads and pressures applied to the door. Fire sealing the perimeters of such doors has been challenging primarily due to out of plane relative distortion between the door and the surrounding land. The distortion tends to be caused by the thermal environment the door and the surrounding land are exposed to during a fire combined with a delta pressure across the door.

SUMMARY

A seal assembly is disclosed herein. In accordance with various embodiments, the seal assembly may comprise a door configured to translate relative to a static structure, and a seal disposed in a seal envelope defined, at least, partially by the door. The seal may comprise a compressible material. The seal may be configured to form a first sealing interface with at least one of a surface of a seal interface section of the static structure or a surface of a radially inward extending wall of the door.

In various embodiments, a seal retainer may extend radially inward from an interior surface of the door, wherein the compressible material of the seal forms a second sealing interface with the seal retainer.

In various embodiments, the compressible material of the seal may be configured to form the first sealing interface with the surface of the seal interface section of the static structure. The surface of the seal interface section of the static structure may be parallel to a direction of motion of the door.

In various embodiments, the compressible material of the seal may be configured to form the first sealing interface with the surface of the seal interface section of the static structure. The surface of the seal interface section of the static structure may be oriented at an angle of less than 90° relative to a direction of motion of the door.

In various embodiments, the static structure further comprises a radially outward extending protrusion and a connecting section extending between the radially outward extending protrusion and the seal interface section. In various embodiments, a radially inward end of the seal retainer is located radially inward of a radially outward end of the radially outward extending protrusion when the door is in a closed position.

In various embodiments, the compressible material of the seal is configured to form the first sealing interface with the surface of the radially inward extending wall of the door, and wherein the surface of the radially inward extending wall of the door is parallel to a direction of motion of the door.

In various embodiments, the compressible material of the seal is configured to form the first sealing interface with the surface of the radially inward extending wall of the door, and the surface of the radially inward extending wall of the door is oriented at an angle of less than 90° relative to a direction of motion of the door.

In various embodiments, the static structure further comprises a connecting section extending at least one of axially or circumferentially from the seal interface section of the static structure, and the compressible material of the seal is spaced about from the connecting section of the static structure when the door is in a closed position.

A nacelle is also disclosed herein. In accordance with various embodiments, the nacelle may comprise an inlet, a fan cowl aft of the inlet, a thrust reverser aft of the fan cowl, and a door configured to cover an opening defined by at least one of the inlet, the fan cowl, or the thrust reverser. A static structure may be coupled to the at least one of the inlet, the fan cowl, or the thrust reverser. The static structure may include a door interface section and a seal interface section extending radially inward from the door interface section. A seal may be disposed in a seal envelope defined, at least, partially by the static structure and the door. The seal may comprise a compressible material. The compressible material of the seal may be configured to form a sealing interface with at least one of a surface of the seal interface section of the static structure or a surface of a radially inward extending wall of the door.

In various embodiments, the seal may be coupled to the door. In various embodiments, the seal may be coupled to the seal interface section of the static structure.

In various embodiments, the static structure may further comprise a connecting section located radially inward of seal when the door is in a closed position. The compressible material of the seal may be spaced apart from the connecting section when the door is in the closed position.

In various embodiments, the surface of the seal interface section of the static structure may be oriented at an angle of less than 90° relative to a plane perpendicular to an axis of rotation of the door.

In various embodiments, the surface of the radially inward extending wall of the door is oriented at an angle of less than 90° relative to a plane perpendicular to an axis of rotation of the door.

In various embodiments, a seal retainer may be extending radially inward from an interior surface of the door. The compressible material may be configured to compress between the seal retainer and the seal interface section of the static structure in response to translation of the door to a closed position.

A seal assembly, in accordance with various embodiments, may comprise a static structure, a door configured to translate relative to the static structure, and a seal disposed in a seal envelope defined, at least, partially by the static structure and the door. The seal may be configured to compress in a direction generally perpendicular to a direction of motion of the door.

In various embodiments, the seal is coupled to at least one of the static structure or the door, and the seal is configured to form a first sealing interface with at least one of a surface of a radially inward extending seal interface section of the static structure or a surface of a radially inward extending wall of the door.

In various embodiments, a seal retainer may be extending radially inward from an interior surface of the door. The seal may form a second sealing interface with the seal retainer. In various embodiments, the compressible material of the seal is configured to form the first sealing interface with the surface of the radially inward extending seal interface section of the static structure, and the surface of the radially inward extending seal interface section of the static structure is oriented at an angle of less than 90° relative to the direction of motion of the door.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
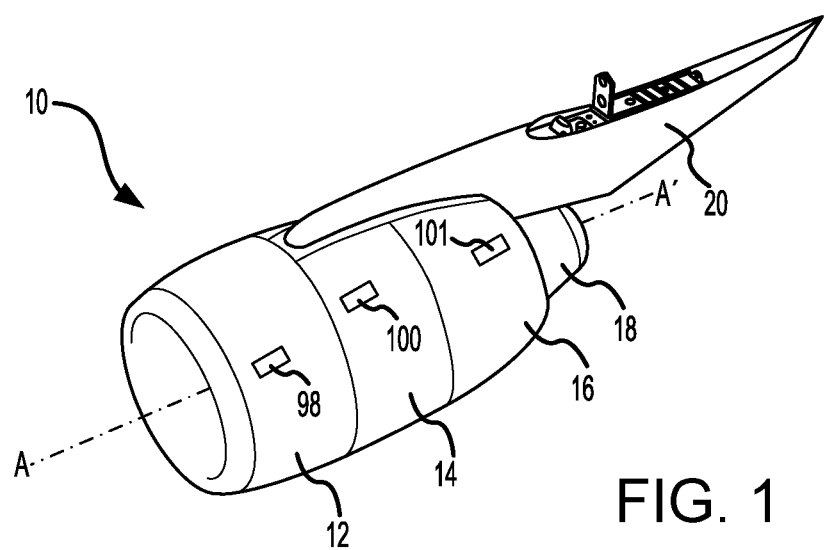
FIG. 1 illustrates a perspective view of a nacelle, in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "radially outward" refers to a direction away from a central longitudinal axis of a nacelle. As used herein, "radially inward" refers to a direction toward the central longitudinal axis of the nacelle. A first component that is "radially inward" of a second component means that the first component is positioned closer to the central longitudinal axis of the nacelle than the second component. A first component that is "radially outward" of a second component means that the first component is positioned at a greater distance away from a central longitudinal axis of the nacelle. The terminology "radially outward" and "radially inward" may also be used relative to reference axes other than the central longitudinal axis of the nacelle.

Seal assemblies, as described herein, may provide a fire seal capable of maintaining a sealing interface while accommodating deflections and pressure differentials, such as those that occur during, for example, a fire. In various embodiments, the fire seal may be located in a sealing envelope defined by a static structure and a door configured to translate (e.g., rotate) relative to the static structure. The fire seal may form a sealing interface with a surface of at least one of the static structure or the door. In accordance with various embodiments, the surface may be oriented at an angle of less than 90° relative to the closing direction of the door. In this regard, the fire seal may compress in a direction that is non-parallel and/or generally normal to the direction of motion of the door. Configuring the fire seal to compress in a direction that is non-parallel to the direction of motion of the door reduces the fire seal's compression value changes as a function of out plane distortions of the door relative to surrounding fixed structures.

The disclosed seal assembly may also be associated with a reduced force for compressing the seal and/or closing the door, as the initial closing compression of the seal (i.e., how much the seal is compressed when closing the door) is less than that of seals that are oriented to compress in the same direction as the closing direction of door. Seals that are oriented to compress in the same direction as the closing direction of door may require a greater starting compression, as compared to seals of present disclosure, in order to maintain a minimum compression (accounting for distortion effects) associated with passing a fire test. Reducing the force associated with closing the door, tends to increase a likelihood that the closing force associated with doors employing the disclosed seal assembly will be within acceptable limits.

Referring to FIG. 1, a nacelle 10 for a propulsion system is illustrated, in accordance with various embodiments. Nacelle 10 may comprise an inlet 12, a fan cowl 14, a thrust reverser 16, and an exhaust system 18. Inlet 12, fan cowl 14, thrust reverser 16, and exhaust system 18 may be position around a central longitudinal axis A-A' of nacelle 10. Nacelle 10 provides smooth aerodynamic surfaces for airflow around and into a gas turbine engine surrounded by nacelle 10. Nacelle 10 may be coupled to a pylon 20. Pylon 20 may be configured to mount nacelle 10 and the gas turbine engine surrounded by nacelle 10 to an aircraft wing or aircraft body.

Nacelle 10 may include one or more door(s), such as door 98, door 100, and door 101.

For example, inlet 11 may include door 98, fan cowl 14 may include door 100, and/or thrust reverser 16 may door 101. In various embodiments, doors 98, 100, 101 may translate between an open position, wherein an interior of nacelle 10 that is radially inward of the door is exposed, and a closed position, wherein the door contacts and/or forms a sealing interface with the underlying nacelle component (e.g., inlet 12, fan cowl 14 or thrust reverser 16). As used herein, "translate" and "translation" may refer to rotational motion, such as pivoting about a hinged joint, or to linear motion. Doors 98, 100, 101 may provide access to components located in the interior of nacelle 10. In various embodiments, one or more of the doors 98, 100, 101 may be a pressure-relief door configured to translate to open position in response to a pressure differential across the door (i.e., the difference between the pressure in the area on the interior of the door and the pressure in the area on the exterior of the door) exceeding a preselected pressure differential. As used herein, "the area on the interior of a door" refers to a space or area that is radially inward of the door, and "the area on the exterior of a door" refers to a space or area that is radially outward of the door.

Figure 2:
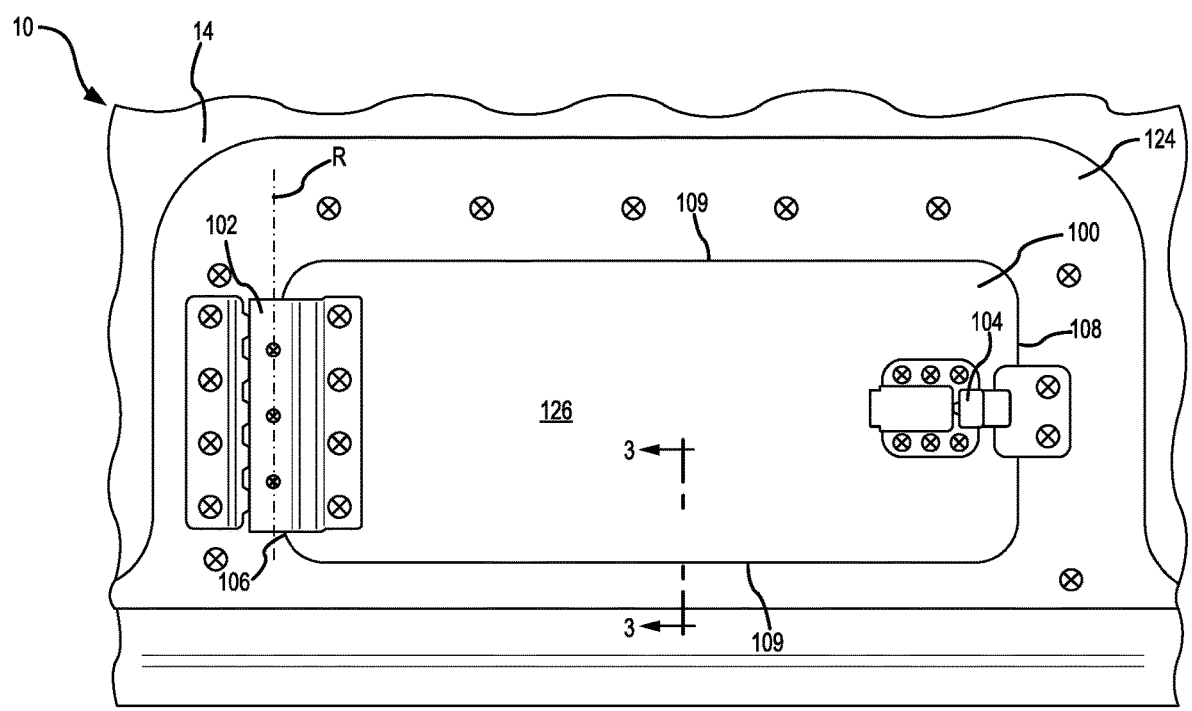
FIG. 2 illustrates a door of a nacelle in a closed position, in accordance with various embodiments.

Referring to FIG. 2, and with continued reference to FIG. 1, a radially outward looking view of door 100 in the closed position is illustrated. While FIG. 2 illustrates a door 100 coupled to fan cowl 14, it should be understood that the doors 98 coupled to inlet 12 and/or the doors 101 coupled to thrust reverser 16 may include the elements and functionalities as described herein with respect to door 100 and fan cowl 14.

In various embodiments, door 100 may be hingedly coupled to fan cowl 14 at hinge joint 102. Door 100 may pivot about hinge joint 102 and relative fan cowl 14. Door 100 may rotate about an axis of rotation R of hinge joint 102. In various embodiments, door 100 may include a latch 104 configured to engage fan cowl 14, thereby securing door 100 in the closed position. In various embodiments, hinge joint 102 is located at a hinge edge 106 of door 100 and latch 104 is located at latch edge 108 of door 100. Latch edge 108 may be generally opposite hinge edge 106. In various embodiments, door 100 may include two side edges 109 extending between hinge edge 106 and latch edge 108. Hinge edge 106 and latch edge 108 may be parallel to axis of rotation R. Side edges 109 may be perpendicular to axis of rotation R. While door 100 is illustrated as hingedly coupled to fan cowl 14, it is further contemplated and understood that door 100 may be discrete from fan cowl 14 such that, in the open position, door 100 may be completely removed from fan cowl 14 (i.e., not contacting and/or not coupled to fan cowl 14). In accordance with embodiments, fan cowl 14 may define an orifice configured to receive door 100. Door 100 may cover and/or generally fill the orifice when in the closed position.

Figure 3A:
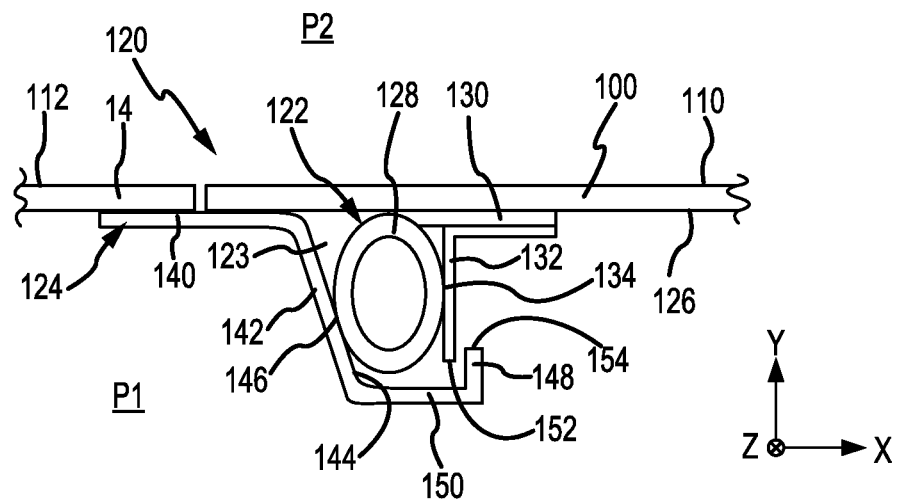
FIG. 3A illustrates a cross-section view taken along the line 3-3 in FIG. 2 and showing a seal assembly for a nacelle door with the door in a closed position, in accordance with various embodiments.

With reference to FIG. 3A, a cross-section view of door 100 taken along the line 3-3 in FIG. 2 is illustrated. In various embodiments, when door 100 is in the closed position, an exterior (or radially outward) surface 110 of door 100 may be relatively flush, or planar, with an exterior (or radially outward) surface 112 of fan cowl 14. In various embodiments, exterior surfaces 110, 112 are oriented generally away from central longitudinal axis A-A' of nacelle 10 in FIG. 1.

In accordance with various embodiments, a seal assembly 120 may be coupled between fan cowl 14 and door 100. Seal assembly 120 includes a seal 122. Seal 122 may be located in a seal envelope 123 defined, at least partially, by door 100 and a static structure 124. In various embodiments, static structure 124 extends radially inward from fan cowl 14. In various embodiments, static structure 124 may be integral with fan cowl 14. Static structure 124 may also be coupled to fan cowl 14 using fasteners, adhesive, or any other suitable attachment technique.

In various embodiments, seal 122 may be coupled to door 100. For example, seal 122 may extend radially inward from an interior surface 126 of door 100. Interior surface 126 of door 100 is opposite exterior surface 110 of door 100. Seal 122 includes a compressible material 128. In various embodiments, compressible material 128 comprises a fire resistant material. In various embodiments, compressible material 128 is configured to withstand temperatures up to 900° F. (482° C.). Stated differently, in various embodiments, compressible material 128 may have a melting point of greater than 600° F. (350° C.), greater than 800° F. (427° C.), and/or greater than 900° F. (482° C.). In various embodiments, compressible material 128 may comprise fiberglass, fiber-reinforce polymer, carbon fabric, and/or flame-resistant meta-aramid material (such as that sold under the mark NOMEX). The compressible material 128 may be selected such that compressible material 128 will exhibit a desired elasticity (e.g., a compression of at least 5% of a width W (FIG. 3B) of compressible material 128).

In various embodiments, compressible material 128 may be attached to a base 130 of seal 122. Base 130 may comprise a generally non-compressible material and/or a material that is less compressible than compressible material 128. For example, base 130 may comprise metal, ceramic, glass, or a non-compressible composite. Compressible material 128 may be attached to door 100 via base 130. Base 130 may be attached to door 100 via fasteners (e.g., screws, rivets, nuts and bolts, pins, clips, etc.), adhesive, or any other suitable attachment technique.

In accordance with various embodiments, seal assembly 120 may include a seal retainer 132 extending radially inward from door 100. Seal retainer 132 may, at least, partially define seal envelope 123. Seal retainer 132 may comprise a generally non-compressible material and/or a material that is less compressible than compressible material 128. For example, seal retainer 132 may comprise metal, ceramic, glass, or a non-compressible composite. Seal retainer 132 may be attached to door 100 via fasteners (e.g., screws, rivets, nuts and bolts, pins, clips, etc.), adhesive, or any other suitable attachment technique. In various embodiments, seal retainer 132 may be attached to door 100 via attachment of seal retainer 132 to base 130 of seal 122. In accordance with various embodiments, seal 122 and seal retainer 132 are configured (e.g., attached to door 100) such that compressible material 128 forms a sealing interface 134 with seal retainer 132.

In accordance with various embodiments, static structure 124 includes a door interface section 140 and a seal interface section 142. Seal interface section 142 extends radially inward from door interface section 140. In accordance with various embodiments and as discussed in further detail below, a surface 144 of seal interface section 142 is configured to form a sealing interface 146 with compressible material 128 of seal 122.

In various embodiments, static structure 124 may include a radially outward extending protrusion 148 and a connecting section 150. Connecting section 150 may extend between radially outward extending protrusion 148 and seal interface section 142. Radially outward extending protrusion 148 is configured to extend from connecting section 150 toward interior surface 126 of door 100. In various embodiments, seal assembly 120 is configured such that, when door 100 is in the closed position, seal retainer 132 is located between seal interface section 142 and radially outward extending protrusion 148, and radially outward extending protrusion 148 axially overlaps or circumferentially overlaps, depending on the location about the periphery of door 100, seal retainer 132. Stated differently, when door 100 is in the closed position, the radially inward end 152 of seal retainer 132 is radially inward of the radially outward end 154 of radially outward extending protrusion 148 and between seal interface section 142 and radially outward extending protrusion 148.

Figure 3B:
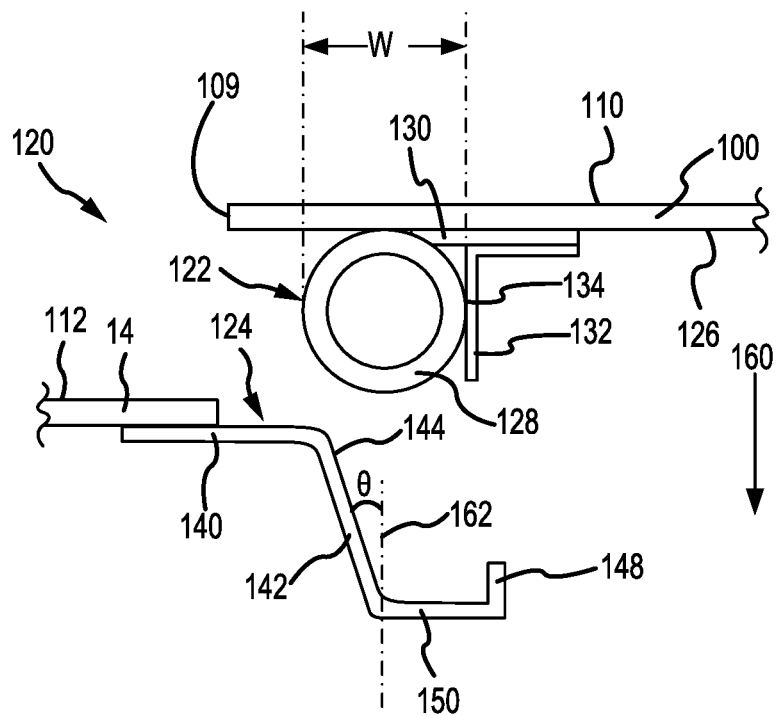
FIG. 3B illustrates a cross-section view of a seal assembly for a nacelle door with the door in a partially open position, in accordance with various embodiments.

With reference to FIG. 3B, door 100 is illustrated in the open position. In accordance with various embodiments, compressible material 128 has a width W, as measured in a direction perpendicular to the direction of motion of door 100 (e.g., as measured in a direction parallel to axis of rotation R in FIG. 2 and/or as measured in a direction parallel to the X axis on the provided XYZ axes). While FIG. 3B shows width W as measured in a direction parallel to axis of rotation R in FIG. 2, it is understood that the width W of compressible material 128 may be measured in other directions depending on where along door 100 seal 122 is located. For example, with combined reference to FIG. 2 and FIG. 3B, the width W of the portions of compressible material 128 located along hinge edge 106 and latch edge 108 is measured in a direction perpendicular to axis of rotation R (i.e., in a direction parallel to the Z axis on the provided XYZ axis).

Seal assembly 120 is configured such that compressible material 128 contacts surface 144 of seal interface section 142, in response to door 100 being translated toward the closed position. As door 100 translates in a radially inward direction (i.e., in direction of arrow 160), compressible material 128 is compressed between surface 144 and seal retainer 132. In this regard, the width W of compressible material 128 decreases, as measured in a direction generally parallel to interior surface 126, in response to door 100 being translated toward the closed position. In accordance with various embodiments, seal 122 is configured to contact and translate along surface 144 with compressible material 128 compressed between surface 144 and seal retainer 132 as door 100 translates to a closed position (e.g., as door 100 translates toward contact with door interface section 140).

In accordance with various embodiments, surface 144 may be oriented at an angle less than 90° relative to the direction of motion of door 100. In various embodiments, an angle theta (θ) of surface 144 relative to a radially extending plane 162 is less than 90°. Radially extending plane 162 is perpendicular to axis of rotation R in FIG. 2 (i.e., parallel to the YZ plane in the provided XYZ axes). While FIG. 3B shows angle theta (θ) as measured relative to a radially extending plane 162 that is perpendicular to axis of rotation R, it is understood that the angle theta (θ) of surface 144 may be measured relative to planes in other directions depending on where along door 100 seal 122 is located. For example, with combined reference to FIG. 2 and FIG. 3B, the angle theta (θ) of portions of surface 144 located along hinge edge 106 and latch edge 108 is measured relative to a plane parallel to axis of rotation R (i.e., along hinge edge 106 and latch edge 108 angle theta (θ) is measured relative to the XY plane on the provided XYZ axis).

The angle of surface 144 tends to increase the compression of compressible material 128 (i.e., decrease width W), in response to radially inward translation of door 100 and seal 122. In various embodiments, angle theta (θ) may between 5° and 85°. In various embodiments, angle theta (θ) may between 15° and 60°. In various embodiments, angle theta (θ) may between 25° and 45°. In various embodiments, angle theta (θ) may be selected to be 0° to 90°. Angle theta (θ) may be selected based on the characteristics of compressible material 128 (e.g., the stiffness of compressible material 128), the coefficient of friction for translation of seal 102 along surface 144, and/or other kinematics of door 100. The effects of angle theta (θ) and the relative forces exerted by seal 102 on surface 144 due to seal stiffness and due to friction are illustrated in FIG. 6B. In various embodiments, angle theta (θ) may vary around the periphery of door 100. For example, in various embodiments, angle theta (θ) may be greater in the portions of static structure 124 that are proximate hinge edge 106 of door 102 (FIG. 2) as compared to the angle theta (θ) of the portions of static structure 124 that are proximate side edges 109 and latch edge 108. In this regard, angle theta (θ) may be inversely related to the proximity of surface 144 to axis of rotation R.

With combined reference to FIG. 3A and FIG. 3B, in various embodiments, door interface section 140 may be configured to contact interior surface 126 of door 100, when door 100 is in the closed position. The angle theta (θ) of surface 144 and the width W of compressible material 128 are selected such that compressible material remains in contact with surface 144, in response to door 100 separating from door interface section 140 a preselected distance. For example, an increase in the pressure differential between interior pressure P1 and exterior pressure P2 or relative distortion due to fire may force door 100 in the radially outward direction. Seal assembly 120 is configured such that compressible material 128 decompresses and the width W of seal 122 increases in a direction perpendicular to the motion of door 100, thereby allowing sealing interface 146 to remain between seal 122 and surface 144 of static structure 124 as door 100 translates away from door interface section 140. In various embodiments, when door 100 is in the closed position, compressible material 128 may be spaced apart (i.e., not contacting) connecting section 150. Eliminating a need for a sealing interface between compressible material 128 connecting section 150 may reduce the resistance or force associated with closing door 100. Compressing seal 122 in a direction generally perpendicular to the direction of motion of door 100 may allow for less compression of seal 122 and/or less force to compress the seal 122, while still maintaining a sealing interface should the volume of seal envelope 123 increase due to fire and/or an increased pressure differential.

Figure 4A:
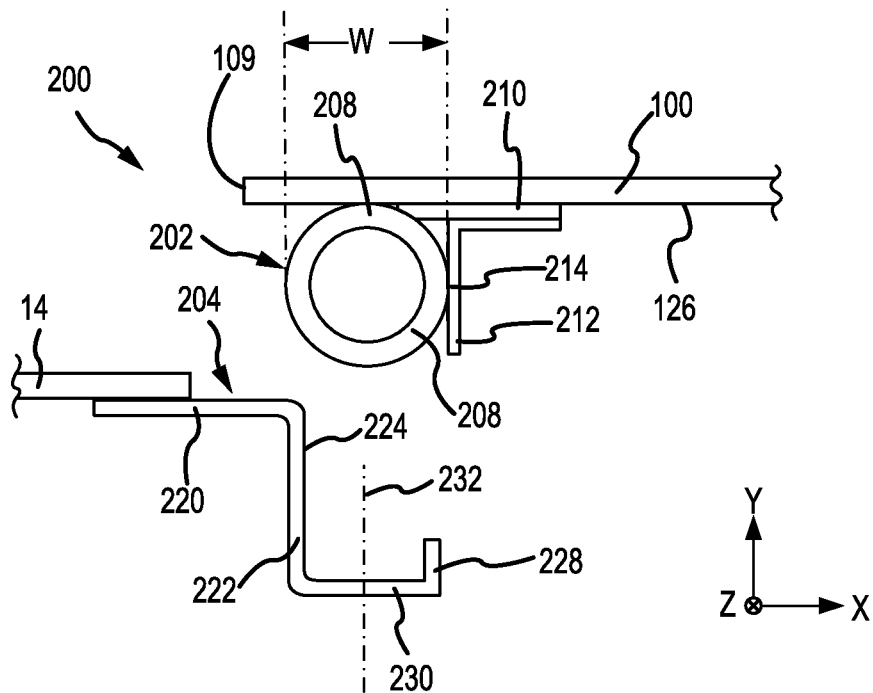
FIGS. 4A and 4B illustrate a cross-section views of a seal assembly for a nacelle door with the door in a partially open position and in a closed position, respectively, in accordance with various embodiments.
Figure 4B:
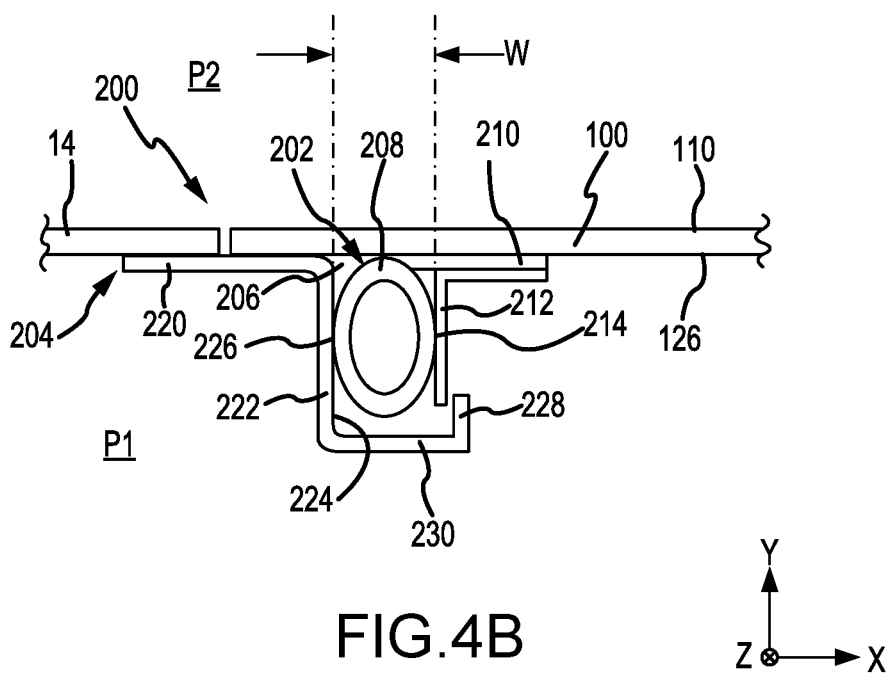

FIGS. 4A and 4B show a seal assembly 200 coupled between door 100 and fan cowl 14. FIG. 4A shows a cross-section view of seal assembly 200 coupled between door 100 and fan cowl 14 with door 100 in an open position. FIG. 4B shows a cross-section view of seal assembly 200 coupled between door 100 and fan cowl 14 with door 100 in a closed position. In various embodiments, seal assembly 200 may replace seal assembly 120 in FIGS. 3A and 3B. In various embodiments, seal assembly 200 may be coupled to a first portion of door 100 and seal assembly 120 may be coupled to a second portion of door 100.

With combined reference to FIGS. 4A and 4B, in accordance with various embodiments, seal assembly 200 may be coupled between fan cowl 14 and door 100. Seal assembly 200 includes a seal 202. Seal 202 may be located in a seal envelope 206 defined, at least partially, by door 100 and a static structure 204. Seal 202 may be similar to seal 122 in FIGS. 3A and 3B. Seal 202 includes a compressible material 208 similar to compressible material 128, and a base 210 similar to base 130 in FIGS. 3A and 3B. In accordance with various embodiments, seal assembly 200 may include a seal retainer 212, similar to seal retainer 132 in FIGS. 3A and 3B. Seal retainer 212 may, at least, partially define seal envelope 206. Compressible material 208 forms a sealing interface 214 with seal retainer 212.

In various embodiments, static structure 204 extends radially inward from fan cowl 14. In various embodiments, static structure 204 may be integral with fan cowl 14. Static structure 204 may also be coupled to fan cowl 14 using fasteners, adhesive, or any other suitable attachment technique. In accordance with various embodiments, static structure 204 includes a door interface section 220 and a seal interface section 222. Seal interface section 222 extends radially inward from door interface section 220. In accordance with various embodiments, a surface 224 of seal interface section 222 is configured to form a sealing interface 226 with compressible material 208 of seal 202. In various embodiments, static structure 204 may include a radially outward extending protrusion 228 and a connecting section 230, similar to radially outward extending protrusion 148 and connecting section 150 of static structure 124.

Compressible material 208 has a width W, as measured in a direction perpendicular to the direction of motion of door 100 (e.g., parallel to the to axis of rotation R in FIG. 2). While FIGS. 4A and 4B show width W as measured in a direction parallel to axis of rotation R in FIG. 2, it is understood that the width W of compressible material 208 may be measured in other directions depending on where along door 100 seal 202 is located. For example, with combined reference to FIG. 2 and FIGS. 4A and 4B, the width W of the portions of compressible material 208 located along hinge edge 106 and latch edge 108 is measured in a direction perpendicular to axis of rotation R (i.e., in a direction parallel to the Z axis on the provided XYZ axis) and the width W of the portions of compressible material 208 located along side edges 109 is measured in a direction parallel to axis of rotation R (i.e., in a direction parallel to the X axis on the provided XYZ axis).

Seal assembly 200 is configured such that compressible material 208 contacts surface 224 of seal interface section 222, in response to door 100 being translated towards the closed position. As door 100 translates in a radially inward direction, compressible material 208 is compressed between surface 224 and seal retainer 212. In this regard, the width W of compressible material 208 decreases, as measured in a direction generally parallel to interior surface 126, in response to door 100 being translated to the closed position. In accordance with various embodiments, seal 202 is configured to contact and translate along surface 224 with compressible material 208 compressed between surface 224 and seal retainer 212, in response to door 100 translating toward a closed position (e.g., toward contact with door interface section 220).

In accordance with various embodiments, surface 224 may be oriented at an angle parallel to the direction of motion of door 100. In various embodiments, surface 244 may be parallel to a radially extending plane 232. Radially extending plane 232 is perpendicular to axis of rotation R in FIG. 2 (i.e., radially extending plane 232 is parallel to the YZ plane in the provided XYZ axes). While FIG. 4A shows surface 244 as perpendicular to axis of rotation R, it is understood that surface 224 may be oriented at other angles relative to axis of rotation R depending on where along door 100 seal 202 is located. For example, with combined reference to FIG. 2 and FIG. 4A, the portions of surface 244 located along hinge edge 106 and latch edge 108 of door 100 may be parallel to axis of rotation R (i.e., parallel to the XY plane on the provided XYZ axis), and the portions of surface 244 located along side edges 109 of door 100 may be perpendicular to axis of rotation R.

In various embodiments, door interface section 220 may be configured to contact interior surface 126 of door 100, when door 100 is in the closed position. The location of surface 224 and the width W of compressible material 208 are selected such that compressible material 208 remains in contact with surface 224, in response to door 100 separating from door interface section 220 a preselect distance. For example, an increase in the pressure differential between interior pressure P1 and exterior pressure P2 or a distortion of door 100 or fan cowl 14 due to fire, may force door 100 in the radially outward direction. Seal assembly 200 is configured such that sealing interface 226 remains formed between compressible material 208 and surface 224 as seal 202 translates along seal interface section 222 due to translation of door 100 away from door interface section 220. Compressing seal 202 in a direction generally perpendicular to the direction of motion of door 100 may allow for less compression of seal 202 and/or less force associated with compressing the seal 202, while still maintaining a sealing interface between seal 202 and static structure 204 should the volume of seal envelope 206 increase due to fire and/or an increased pressure differential.

Figure 5A:
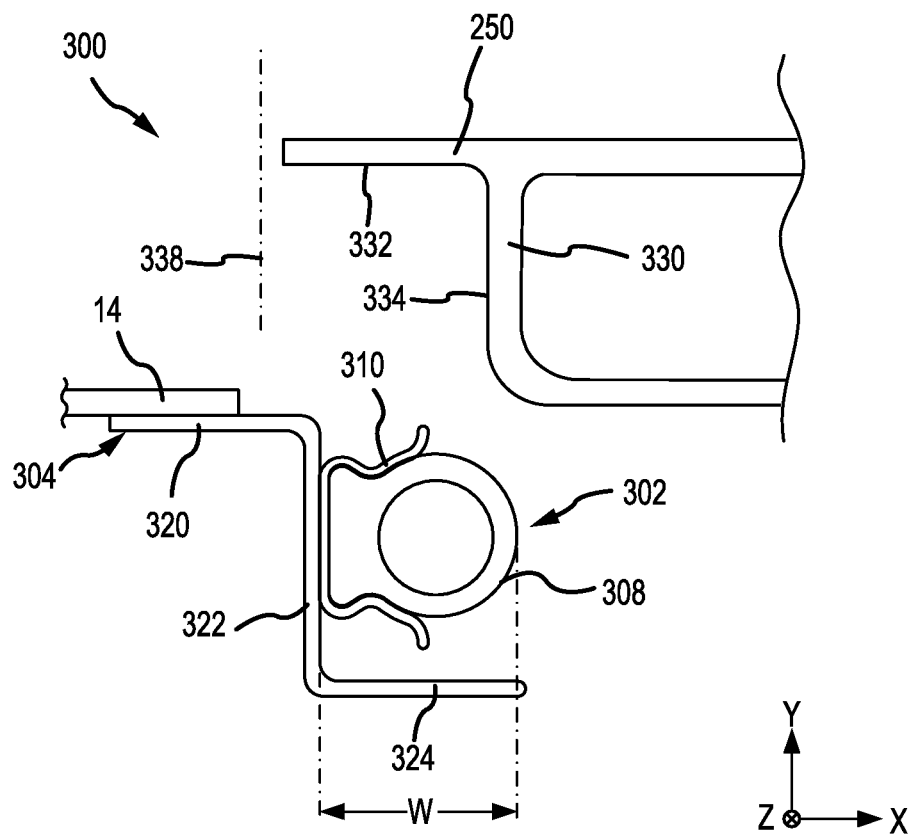
FIGS. 5A and 5B illustrate a cross-section views of a seal assembly for a nacelle door with the door in a partially open position and in a closed position, respectively, in accordance with various embodiments.
Figure 5B:
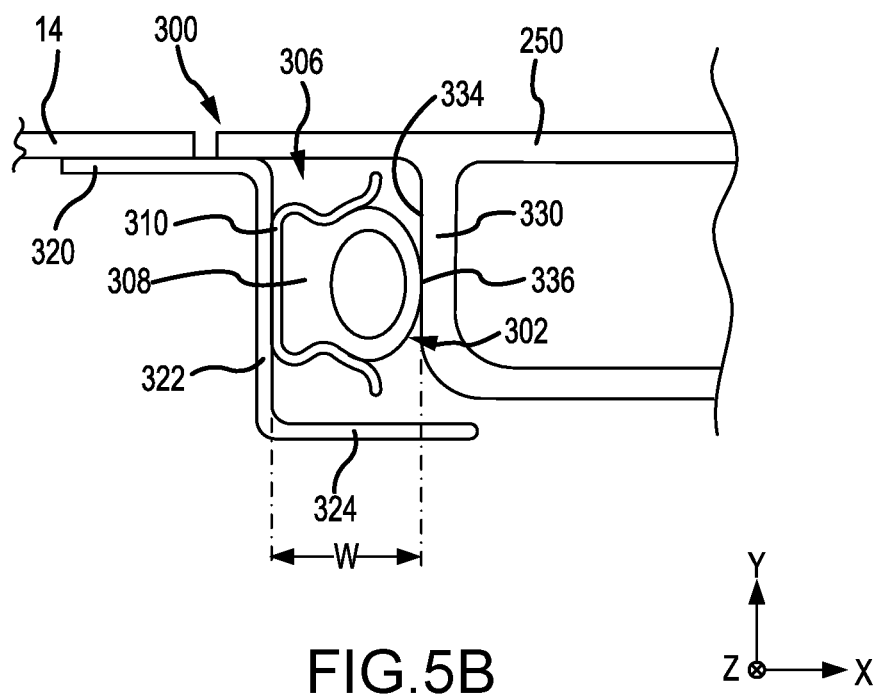

FIGS. 5A and 5B show a seal assembly 300 coupled between a door 250 and fan cowl 14. FIG. 5A shows a cross-section view of seal assembly 300 coupled between door 250 and fan cowl 14 with door 250 in an open position. FIG. 5B shows a cross-section view of seal assembly 300 coupled between door 250 and fan cowl 14 with door 250 in a closed position. In various embodiments, door 250 may replace door 100 in FIG. 2.

With combined reference to FIGS. 5A and 5B, in accordance with various embodiments, seal assembly 300 may be coupled between fan cowl 14 and door 250. Seal assembly 300 includes seal 302. Seal 302 may be located in a seal envelope 306 defined, at least partially, by door 250 and a static structure 304. Seal 302 includes a compressible material 308 similar to compressible material 128. Compressible material 308 may be coupled to a base 310 of seal 302. Base 310 may comprise a non-compressible material, similar to base 130 in FIGS. 3A and 3B.

Static structure 304 extends radially inward from fan cowl 14. In various embodiments, static structure 304 may be integral with fan cowl 14. Static structure 304 may also be coupled to fan cowl 14 using fasteners, adhesive, or any other suitable attachment technique. In accordance with various embodiments, static structure 304 includes a door interface section 320 and a seal interface section 322. Seal interface section 322 extends radially inward from door interface section 320. Compressible material 308 may be attached to seal interface section 322 of static structure 304 via base 310. Base 310 may be attached to seal interface section 322 via fasteners (e.g., screws, rivets, nuts and bolts, pins, clips, etc.), adhesive, or any other suitable attachment technique. In various embodiments, static structure 304 may include a connecting section 324 extending circumferentially or axially from seal interface section 322.

In various embodiments, door 250 includes a radially inward extending wall 330. Wall 330 may extend radially inward from an interior surface 332 of door 250. Wall 330 may, at least, partially define seal envelope 306. In accordance with various embodiments, a surface 334 of wall 330 is configured to form a sealing interface 336 with compressible material 308 of seal 302.

Compressible material 308 has a width W, as measured in a direction perpendicular to the direction of motion of door 250 (e.g., as measured in a direction parallel to axis of rotation R in FIG. 2 and/or as measured in a direction parallel to the X axis on the provided XYZ axes). While FIGS. 5A and 5B show width W as measured in a direction parallel to axis of rotation R in FIG. 2, it is understood the width W of compressible material 308 may be measured in other directions depending on where along door 250 compressible material 308 form sealing interface 336. For example, with combined reference to FIG. 2 and FIGS. 5A and 5B, the width W of the portions of compressible material 308 located the hinge edge and latch edge of door 250 is measured in a direction perpendicular to axis of rotation R (i.e., in a direction parallel to the Z axis on the provided XYZ axis).

Seal assembly 300 is configured such that compressible material 308 contacts surface 334 of wall 330, in response to door 250 being translated towards the closed position. As door 250 translates in a radially inward direction, compressible material 308 is compressed between surface 334 and seal interface section 322. In this regard, the width W of compressible material 308 decreases, as measured in a direction parallel to interior surface 332, in response to door 250 being translated to the closed position. In accordance with various embodiments, surface 334 is configured to contact and translate along seal 302 with compressible material 308 compressed between surface 334 and seal interface section 322, in response to door 250 translating to a closed position (e.g., translating toward contact with door interface section 320).

In accordance with various embodiments, surface 334 of wall 330 may be oriented at an angle parallel to the direction of motion of door 250. In various embodiments, surface 334 may be parallel to a radially extending plane 338. Radially extending plane 338 is perpendicular to axis of rotation R in FIG. 2 (i.e., radially extending plane 338 is parallel to the YZ plane in the provided XYZ axes). While FIG. 5A shows surface 334 as perpendicular to axis of rotation R, it is understood that surface 334 may be oriented at other angles relative to axis of rotation R depending on where along door 250 surface 334 is located. For example, with combined reference to FIG. 2 and FIG. 5A, the portions of surface 344 located along a hinge edge and a latch edge of door 250 may be parallel to axis of rotation R (i.e., parallel to the XY plane on the provided XYZ axis), and the portions of surface 334 located along the side edges of door 250 may be perpendicular to axis of rotation R.

In various embodiments, door interface section 320 of static structure 304 may be configured to contact interior surface 332 of door 250, when door 250 is in the closed position. The location of surface 334 and the width W of compressible material 308 are selected such that compressible material 308 remains in contact with surface 334, in response to door 250 separating from door interface section 320 a preselect distance. For example, an increase in the pressure differential between interior pressure P1 and exterior pressure P2 or a distortion of door 250 or fan cowl 14 due to fire, may force door 250 in the radially outward direction. Seal assembly 300 is configured such that sealing interface 336 remains formed between compressible material 308 and surface 334 as wall 330 translates along seal 302 due to translation of door 250 away from door interface section 320. Compression of seal 302 is proportional to slope of surface 334. In this regard, the compression of seal 302 tends to remain constant as door 250 separates from door interface section 320 due to surface 334 being oriented parallel to direction of motion of door 250. Compressing seal 302 in a direction generally perpendicular to the direction of motion of door 250 may allow for less compression seal 302 and/or less force to compress seal 302, while still maintaining a sealing interface between seal 302 and wall 330 should the volume of seal envelope 306 increase due to fire and/or an increased pressure differential.

Figure 6A:
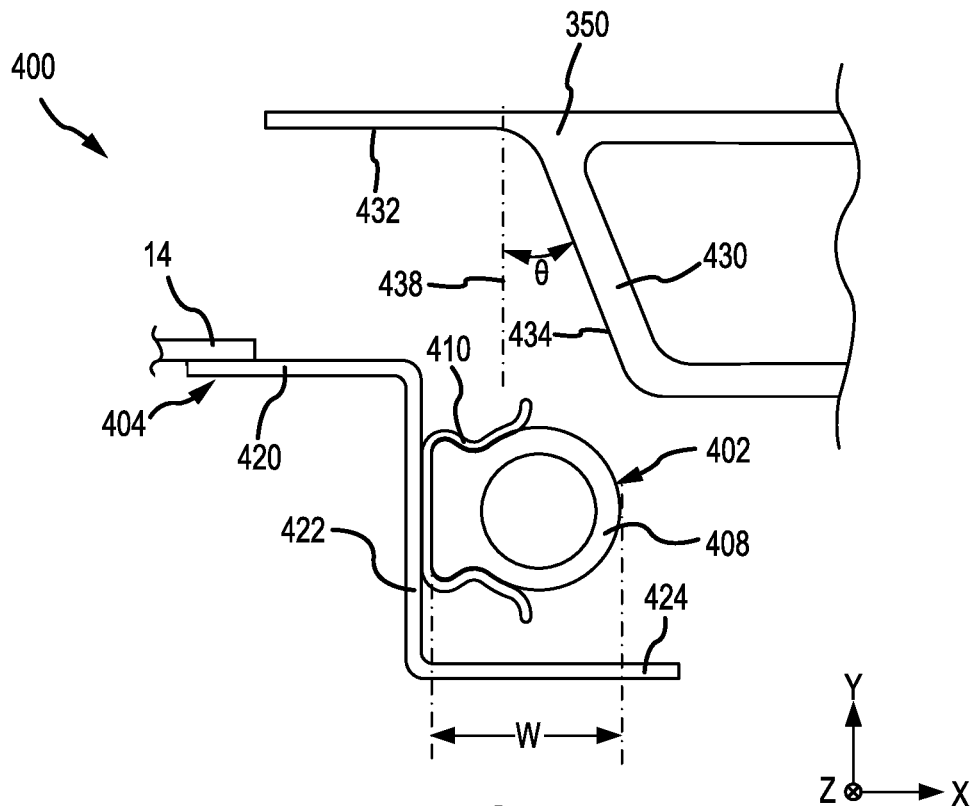
FIGS. 6A and 6B illustrate a cross-section views of a seal assembly for a nacelle door with the door in a partially open position and in a closed position, respectively, in accordance with various embodiments.
Figure 6B:
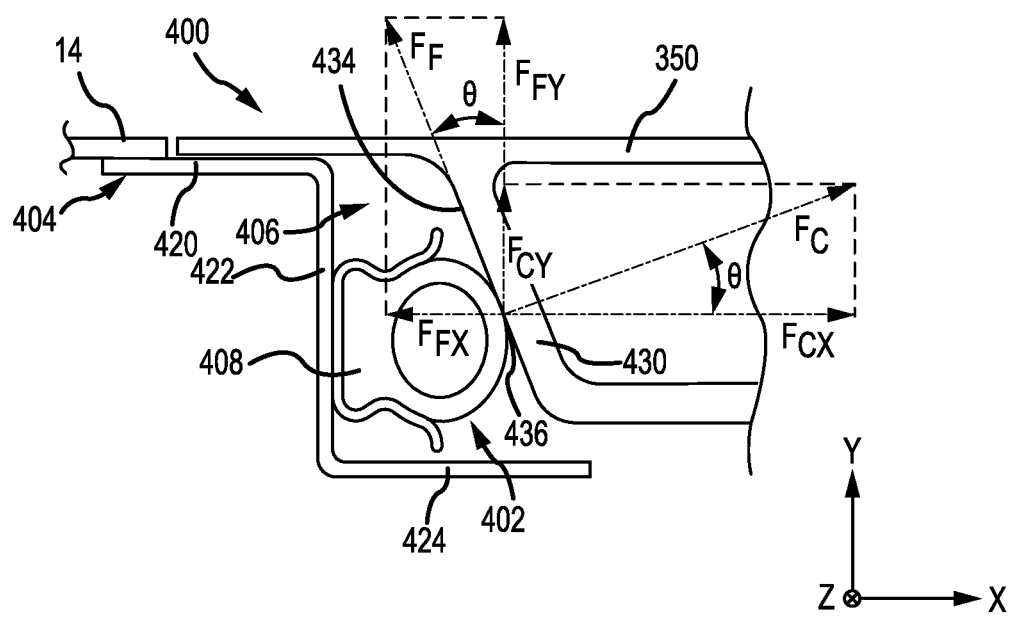

FIGS. 6A and 6B show a seal assembly 400 coupled between a door 350 and fan cowl 14. FIG. 6A shows a cross-section view of seal assembly 400 coupled between door 350 and fan cowl 14 with door 350 in an open position. FIG. 6B shows a cross-section view of seal assembly 400 coupled between door 350 and fan cowl 14 with door 350 in a closed position. In various embodiments, door 350 may replace door 100 in FIG. 2.

With combined reference to FIGS. 6A and 6B, in accordance with various embodiments, seal assembly 400 may be coupled between fan cowl 14 and door 350. Seal assembly 400 includes a seal 402. Seal 402 may be located in a seal envelope 406 defined, at least, partially by door 350 and a static structure 404. Seal 402 includes a compressible material 408 similar to compressible material 128, in FIGS. 3A and 3B. Compressible material 408 may be coupled to a base 410 of seal 402. Base 410 may comprise a non-compressible material, similar to base 130 in FIGS. 3A and 3B.

Static structure 404 extends radially inward from fan cowl 14. In various embodiments, static structure 404 may be integral with fan cowl 14. Static structure 404 may also be coupled to fan cowl 14 using fasteners, adhesive, or any other suitable attachment technique. In accordance with various embodiments, static structure 404 includes a door interface section 420 and a seal interface section 422. Seal interface section 422 extends radially inward from door interface section 420. Compressible material 408 may be attached to seal interface section 422 of static structure 404 via base 410. Base 410 may be attached to seal interface section 422 via fasteners (e.g., screws, rivets, nuts and bolts, pins, clips, etc.), adhesive, or any other suitable attachment technique. In various embodiments, static structure 404 may include a connecting section 424 extending circumferentially or axially from seal interface section 422.

In various embodiments, door 350 includes a radially inward extending wall 430. Wall 430 may extend radially inward from an interior surface 432 of door 350. Wall 430 may, at least, partially define seal envelope 406. In accordance with various embodiments, a surface 434 of wall 430 is configured to form a sealing interface 436 with compressible material 408 of seal 402.

Compressible material 408 has a width W, as measured in a direction perpendicular to the direction of motion of door 350 (e.g., as measured in a direction perpendicular to the radial direction). Seal assembly 400 is configured such that compressible material 408 contacts surface 434 of wall 430, in response to door 350 being translated towards the closed position. As door 350 translates in a radially inward direction, compressible material 308 is compressed between surface 434 and seal interface section 422. In this regard, the width W of compressible material 408 decreases, as measured in a direction parallel to interior surface 432 of door 350, in response to door 350 being translated toward the closed position. In accordance with various embodiments, surface 434 is configured to contact and translate along seal 402 with compressible material 408 compressed between surface 434 and seal interface section 422, in response to door 350 translating to a closed position (e.g., translating toward contact with door interface section 420).

In accordance with various embodiments, surface 434 may be oriented at an angle less than 90° relative to the direction of motion of door 250. In various embodiments, an angle theta (θ) of surface 434 relative to a radially extending plane 438 is less than 90°. Radially extending plane 438 is perpendicular to axis or rotation R in FIG. 2. While FIG. 6A shows angle theta (θ) measured relative to a radially extending plane 438 that is perpendicular to axis of rotation R, it is understood that the angle theta (θ) of surface 434 may be measured relative to planes in other directions depending on where surface 434 is located on door 350. For example, with combined reference to FIG. 2 and FIG. 6A, the angle theta (θ) of portions of surface 434 located along a hinge edge and/or a latch edge of door 350 is measured relative to a plane parallel to axis of rotation R (i.e., relative to the XY plane on the provided XYZ axis) and the angle theta (θ) of portions of surface 434 located along the side edges of door 350 is measured relative to a plane perpendicular to axis of rotation R (i.e., relative to the YZ plane on the provided XYZ axis).

The angle of surface 334 tends to increase the compression of compressible material 408 (i.e. decrease width W), in response to radially inward translation of door 350. In various embodiments, angle theta (θ) may between 5° and 85°. In various embodiments, angle theta (θ) may between 15° and 60°. In various embodiments, angle theta (θ) may between 25° and 45°. Angle theta (θ) may be selected based on the characteristics of compressible material 128 (e.g., the stiffness of compressible material 128) and the coefficient of friction for translation of seal 102 along surface 144. The effects of angle theta (θ) and the relative forces exerted by seal 102 on surface 144 due to seal stiffness and due to friction are illustrated in FIG. 6B. In various embodiments, angle theta (θ) may vary around the periphery of door 100.

In various embodiments, door interface section 420 may be configured to contact interior surface 432 of door 350, when door 350 is in the closed position. The angle theta (θ) of surface 434 and the width W of compressible material 408 are selected such that compressible material remains in contact with surface 434, in response to door 350 separating from door interface section 420 a preselected distance. For example, an increase in the pressure differential between interior pressure P1 and exterior pressure P2 or relative distortion due to fire may force door 350 in the radially outward direction. Seal assembly 400 is configured such that compressible material 408 decompresses and the width W of seal 402 increases in a direction perpendicular to the motion of door 350, as door 350 translates away from door interface section 420, thereby allowing sealing interface 436 to remain between seal 402 and surface 434 of wall 430. Compressing seal 402 in a direction generally perpendicular to the direction of motion of door 350 may allow for less compression of seal 402 and/or less force to compress the seal 402, while still maintaining a sealing interface should the volume of seal envelope 406 increase due to fire and/or to an increased pressure differential.

In accordance with various embodiments, the material and/or stiffness of compressible material 408 and the angle theta (θ) of surface 334 may be selected based on a desired resistance to closing threshold (i.e., a force associated with closing door 350 and compressing seal 402. For example, with reference to FIG. 6B, the resistance to closing is equal to $F_{CY}$ plus $F_{FY}$ (resistance to closing=$F_{CY}·F_{FY}$), where Fc is the force exerted by seal 402 on surface 434 due to the stiffness of compressible material 408; and $F_F$ is the force exerted by seal 402 on surface 434 due friction between seal 402 and surface 434 as door 350 is translated to the closed position. In this regard, as angle theta (θ) approaches zero, $F_{CY}$ approaches zero and $F_{FY}$ approaches the desired resistance to closing threshold, wherein the desired resistance to closing threshold is equal to the product of the seal compression, the seal stiffness, and the coefficient of friction (i.e., θ→0, $F_{CY}$→0, and $F_{FY}$→desired resistance to closing threshold=(seal compression)×(seal stiffness)×(coefficient of friction). In the disclosed configuration seal assemblies, even with theta (θ) equal to zero and $F_{CX}$ equal to an upper or maximum force, $F_{CX}$ does not resist closing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly, comprising:
   a static structure including a seal interface section, a radially outward extending protrusion, and a connecting section extending between the radially outward extending protrusion and the seal interface section;
   a door configured to translate relative to the static structure;
   a seal disposed in a seal envelope defined, at least, partially by the door and the static structure, the seal comprising a compressible material, wherein the seal is configured to form a first sealing interface with a surface of the seal interface section of the static structure; and
   a seal retainer extending radially inward from an interior surface of the door, wherein the compressible material of the seal forms a second sealing interface with the seal retainer.

2. The seal assembly of claim 1, wherein the surface of the seal interface section of the static structure is parallel to a direction of motion of the door.

3. The seal assembly of claim 1, wherein the surface of the seal interface section of the static structure is oriented at an angle of less than 90° relative to a direction of motion of the door.

4. The seal assembly of claim 1, wherein a radially inward end of the seal retainer is located radially inward of a radially outward end of the radially outward extending protrusion of the static structure when the door is in a closed position.

5. The seal assembly of claim 1, wherein the compressible material of the seal is spaced apart from the connecting section of the static structure when the door is in a closed position.

6. A nacelle, comprising:
   an inlet;
   a fan cowl aft of the inlet;
   a thrust reverser aft of the fan cowl;
   a door configured to cover an opening defined by an exterior surface of at least one of the inlet, the fan cowl, or the thrust reverser, wherein the exterior surface is oriented away from a central longitudinal axis of the nacelle;
   a static structure coupled to the at least one of the inlet, the fan cowl, or the thrust reverser, the static structure including a door interface section and a seal interface section extending radially inward from the door interface section, wherein the door is configured to translate relative to the static structure and in a radial direction; and
   a seal disposed in a seal envelope defined, at least, partially by the static structure and the door, the seal comprising a compressible material, wherein the compressible material of the seal is configured to form a sealing interface with at least one of a surface of the seal interface section of the static structure or a surface of a radially inward extending wall of the door.

7. The nacelle of claim 6, wherein the seal is coupled to the door.

8. The nacelle of claim 6, wherein the seal is coupled to the seal interface section of the static structure.

9. The nacelle of claim 6, wherein the static structure further comprises a connecting section located radially inward of the seal when the door is in a closed position, and wherein the compressible material of the seal is spaced apart from the connecting section when the door is in the closed position.

10. The nacelle of claim 6, wherein the surface of the seal interface section of the static structure is oriented at an angle of less than 90° relative to a plane perpendicular to an axis of rotation of the door.

11. The nacelle of claim 6, wherein the surface of the radially inward extending wall of the door is oriented at an angle of less than 90° relative to a plane perpendicular to an axis of rotation of the door.

12. The nacelle of claim 6, further comprising a seal retainer extending radially inward from an interior surface of the door, wherein the compressible material is configured to compress between the seal retainer and the seal interface section of the static structure in response to translation of the door to a closed position.

13. A seal assembly, comprising:
   a static structure;
   a door configured to translate relative to the static structure and in a vertical direction; and
   a seal disposed in a seal envelope defined, at least, partially by the static structure and the door, wherein the seal is configured to compress between the static structure and the door, and wherein the seal compresses in a direction perpendicular to the vertical direction of motion of the door.

14. The seal assembly of claim 13, wherein the seal is coupled to the static structure, and wherein the seal is configured to form a sealing interface with a surface of a radially inward extending wall of the door, and wherein the seal and the surface of the radially inward extending wall of the door are configured to form the sealing interface in response to translation of the door in a radially inward direction.

15. The seal assembly of claim 14, wherein the surface of the radially inward extending wall of the door is parallel to the vertical direction of motion of the door.

16. The seal assembly of claim 14, wherein the surface of the radially inward extending wall of the door is oriented at an angle of less than 90° relative to the vertical direction of motion of the door.

* * * * *